April 2, 1957     A. H. BURKHOLDER ET AL     2,787,563
METHOD FOR EFFECTING CLEAN HEAT-TRANSFER SURFACES
Filed July 20, 1954
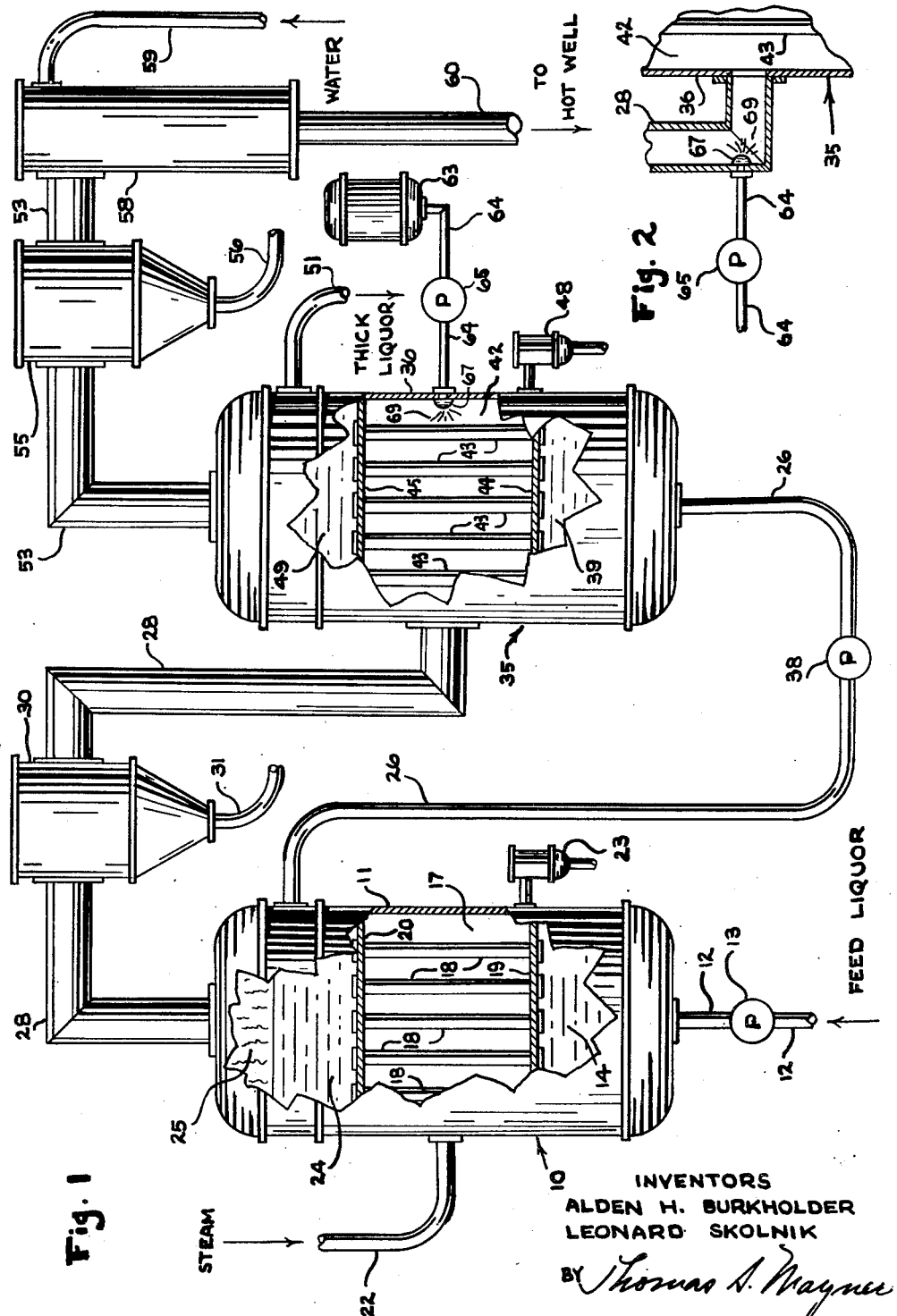
INVENTORS
ALDEN H. BURKHOLDER
LEONARD SKOLNIK
BY Thomas A. Wagner
ATTORNEY 2,787,563
Patented Apr. 2, 1957

2,787,563

METHOD FOR EFFECTING CLEAN HEAT-TRANSFER SURFACES

Alden H. Burkholder and Leonard Skolnik, Cleveland, Ohio, assignors to Industrial Rayon Corporation, Cleveland, Ohio, a corporation of Delaware Application July 20, 1954, Serial No. 444,524

15 Claims. (Cl. 134—28)

This invention relates to a method for effecting a clean, deposit-free condition for heat-transfer surfaces exchanging heat from or condensing vapors containing appreciable amounts of free, elemental sulfur. In particular, it relates to a method for eliminating sulfur deposits on heat-transfer surfaces being employed to cool or condense aqueous vapors generated from spent viscose coagulating liquids and like sulfur-containing or providing liquid compositions.

In the manufacture of various shaped articles from viscose, wherein sulfuric acid-containing coagulating liquids are employed, it is the usual practice to recover the valuable components of the spent or used coagulating liquid. For example, in the manufacture of viscose rayon yarn, thread and the like, or similar extruded products from viscose, the spent coagulating liquid or spin bath, after having been employed in the extrusion or spinning, is frequently subjected to recovery processes. Sodium sulfate and other constituent materials which are produced as a result of the reaction during extrusion between viscose and the coagulating liquid may thereby be obtained. Substantial economies in the process may thus be realized.

The recovery may be performed by first concentrating the spent coagulating liquid and subsequently processing it according to salt crystallizing techniques. The liquid concentration may be accomplished by evaporating the spent coagulating liquid in evaporators. It is advantageous to employ multiple-effect evaporators for this purpose to secure increased economies in the consumption of steam required for the evaporation. In such evaporators, according to common practice, the vapors generated by evaporation of a spent coagulating liquid in a first evaporator unit, or effect of the evaporator, are employed as a heat-exchanging medium for supplying heat to spent coagulating liquid in a subsequent and interconnected secondary evaporator unit or effect. Double and triple effect evaporators, having respectively two and three inter-related and connected evaporator units, may thus be employed. If desired, a greater number of effects may be employed for the evaporator.

Among various constituents, spent viscose coagulating liquids contain free, elemental sulfur. This is mostly derived from the oxidation of hydrogen sulfide in the presence of air in the coagulating liquid. By-product hydrogen sulfide is unavoidably formed during the coagulating reaction between viscose and sulfuric acid-containing coagulating liquids. Considerable amounts of the hydrogen sulfide usually remain dissolved in the spent coagulating liquid. Increasing temperatures accelerate its oxidation in the presence of air to sulfur. Minor amounts of free, elemental sulfur may also be formed from various other reactions which occur during the coagulation reaction.

Vapors being evaporated from spent coagulating liquid contain appreciable amounts of free, elemental sulfur. The sulfur in spent coagulating liquid exerts a sufficient vapor pressure to permit its steam distillation to occur under the conditions of evaporation. Such vapors may usually be observed to contain sulfur in an amount between about 10 and 20 parts per million (p. p. m.) by volume. Frequently there are about 15 p. p. m. by volume of sulfur in the vapors. The amount of sulfur in the vapors depends largely upon the temperature of the spent coagulating liquid during the evaporation. When such sulfur containing vapors are cooled or condensed on a heat-transfer surface, a tightly adhering sulfur deposit or coating is formed on the surface by a substantial portion of the sulfur in the vapors which remains thereon. Often as much as half of the sulfur present in the vapors will deposit on the heat-transfer surface. The deposit decreases the heat-exchanging efficiency of the heat-transfer surface.

In addition, when spent viscose coagulating liquids containing zinc ions are evaporated, the sulfur deposits may also be augmented by the simultaneous deposit of minor amounts of zinc compounds, such as zinc sulfide. This results from the entrainment of the coagulating liquid during evaporation. Depending on the composition of the spent coagulating liquid and the degree or extent of its entrainment in the vapors during evaporation, the sulfur deposits may contain as much as 5% or more by weight of deposited zinc compounds. The occurrence of sulfur deposits on the heat-transfer surfaces of secondary or subsequent effects in multiple-effect evaporators being employed for concentrating spent viscose coagulating liquids limits the efficiency of evaporating in multiple-effect to an extent that it may overshadow the advantages of employing this technique. Costly cleaning of the deposits from the heat-transfer surfaces is required to maintain the secondary evaporator effects in an efficient operating condition.

It is economically advantageous to maintain a relatively clean and substantially deposit-free condition on heat-transfer surfaces employed to cool or condense vapors containing appreciable amounts of free, elemental sulfur, especially in the secondary or subsequent effects of multiple-effect evaporators utilized for concentrating spent viscose coagulating and the like liquids. In a clean condition, the heat-exchanging efficiency of such heat-transfer surfaces can be beneficially kept at a constantly high and optimum level. The evaporator can be operated according to designed capacities. Concentration of spent viscose coagulating liquid by multiple-effect evaporation can then be efficiently and more economically performed. The benefits of increased steam economy by such a technique would not be sacrificed on account of excessively frequent and costly requirements to periodically clean sulfur deposits from the heat-transfer surfaces in order to maintain them in an efficient operating condition.

In accordance with the present invention, a clean and substantially deposit-free condition is effected on an operating heat-transfer surface which is cooling or condensing vapors containing appreciable amounts of free, elemental sulfur by first applying a wetting amount of a pine oil as a film covering over the surface whenever an accumulation of sulfur deposits assumes proportions sufficient to objectionably interfere with the heat-exchanging rate. The pine oil frees the surface from the accumulated sulfur deposits. The film of pine oil and the released sulfur deposits contained therein are then removed from the heat-transfer surface by the washing or flushing effect of further vapor condensation. The mixture is disposed of in the condensate. It is desirable to apply the pine oil to the operating heat-transfer surface during predetermined, spaced intervals of relatively short duration which recur frequently enough to prevent the sulfur deposits from attaining an objectionable accumulation. The deposit removal may thus advantageously be effected without disrupting or suspending continuing operation of the heat-transfer surface.

The film covering of the pine oil may be applied to the heat-transfer surface in any desired manner. It may, for example, be directly applied by being dripped or wiped on the surface or by any other suitable manner of direct application. Advantageously, however, the pine oil is first incorporated in the vapors being evaporated from the spent coagulating liquid and is then applied to the surface by being precipitated from the vapors as a film covering on the heat-transfer surface while the vapors are cooling or condensing thereon. For example, in multiple-effect evaporators concentrating spent viscose coagulating liquids, the pine oil is incorporated in the vapors being evaporated from spent coagulating liquid in any of the effects before such vapors are cooled or condensed while exchanging heat on the heat-transfer surface of any subsequent interconnected effect. Incorporation of the pine oil in the vapors may be satisfactorily accomplished by employing an atomizing or spraying technique which vaporizes the pine oil substance or disperses it as very fine droplets or mist in the vapors.

Should the sulfur deposits contain minor proportions of deposited zinc compounds, the wetting of the deposit-bearing heat-transfer surface with the pine oil may advantageously be preceded by a like application to the surface of a wetting amount of an organic acid material which forms an oil soluble zinc ester, such as oleic acid and like organic acids.

Further advantages will become apparent in the following description and the accompanying drawing, wherein:

Figure 1 is a schematic representation in cut-away front elevation, partially in section, of a double-effect evaporator for concentrating spent viscose coagulating liquid which includes an embodiment of the present invention; and Figure 2 represents, in section, the embodiment of the invention on another portion of the evaporator.

The double-effect evaporator shown in Figure 1 comprises a pair of interconnected vertical-tube evaporator units. The evaporator unit constituting the first-effect of the evaporator is indicated generally by the reference numeral 10; the unit constituting the second-effect of the evaporator by numeral 35. As shown, a simple forward feed from the first to the second-effect of the evaporator is employed. However, it is to be understood that backward feed or mixed feed arrangements also may be utilized.

The body or shell 11 of the first-effect evaporator unit 10 is internally divided into a lower feed liquor compartment 14, a central steam chest 17 and an upper boiling liquor compartment 24. A vapor space 25 is in the uppermost top portion of the evaporator body 11. A lower tube sheet 19 separates the lower feed liquor compartment 14 from the steam chest 17 which is separated from the upper boiling liquor compartment by an upper tube sheet 20. A tube bank, comprised of a plurality of vertical tubes 18, extends through the steam chest 17 to interconnect the feed liquor compartment 14 with the boiling liquor compartment 24. The tubes are fastened at both ends to the upper and lower tube sheets 19 and 20 by suitable means. According to common practice, they may be rolled at their ends to tightly fit in apertures in the tube sheets 19 and 20 in which they are positioned. The tubes 18 essentially provide the major heat-transfer surface through which the evaporating liquid is heated. Steam under pressure is admitted to the steam chest 17 through a steam inlet 22 for this purpose. Steam condensate is evacuated from the steam chest 17 through a condensate trap and outlet 23.

The spent viscose coagulating liquid to be concentrated by evaporation, which frequently contains dissolved zinc compounds providing zinc ions, is admitted as a feed liquor through the feed liquor inlet 12 to the feed liquor compartment 14 by means of the pump 13, or by other suitable means. The feed liquor is forced upwardly through the tubes 18 of the tube bank wherein it is heated and brought to a boiling temperature by heat exchanged from the steam in the steam chest through the tubes 18. Vapors from the concentrated feed liquor in the boiling liquor compartment 24 form in the vapor space 25 at the top of the evaporator. These vapors contain appreciable amounts of free, elemental sulfur. Usually they also carry entrained amounts of the boiling liquor. Although not shown in the drawing, a vacuum may be applied on the first-effect if operation is desired at lowered boiling points for the feed liquor to obtain a greater temperature differential between the steam and feed liquor. This is common practice to augment the heat-exchanging rate of the first-effect of the evaporator. The sulfur containing vapors from the first-effect of the evaporator pass through a vapor line 28 to the second-effect evaporator unit 35. A catchall or entrainment separator 30 is employed in the vapor line 28 for removing the entrained boiling liquor from the vapors. Some entrained liquor, however, may pass through the catchall 30 with the vapors. The liquor return 31 from the catchall 30 conducts entrained liquor, removed from the vapors, for further evaporation in either one of the evaporator effects or to any other desired disposal.

The boiling liquor from the first-effect of the evaporator is withdrawn from the boiling liquor compartment 24 and passed through the conduit 26 by a pump 38, or other suitable means, to the second-effect feed liquor compartment 39 for further evaporation in the second-effect evaporator unit 35. In a similar sequence to that employed in the first-effect of the evaporator, the second-effect feed liquor is forced upwardly from the feed liquor compartment 39 through a vertical tube bank, comprised of a plurality of tubes 43 to a boiling liquor compartment 49. The tubes are fastened between lower and upper tube sheets 44 and 45 which form the vapor chest 42 in the second-effect evaporator body 36. The vapors from the first-effect of the evaporator are passed from the vapor line 28 to the vapor chest 42 to heat the second-effect feed liquor in the tubes 43. During this vapor condensing heat exchange, sulfur deposits are formed on the heat-transfer surface of the tubes 43. A vapor condensate trap and outlet 48 evacuates the vapor chest 42. The second-effect of the evaporator is operated under less absolute pressure, or greater vacuum, than the first-effect. In this manner, the concentrated feed liquor in the second-effect of the evaporator will boil at a lesser temperature than that of the first-effect vapors to permit the exchange of heat from the vapors to the feed liquor to occur.

The pine oil is applied on the condensing surface of the tubes 43 to release and eliminate sulfur deposits which may have accumulated thereon. A surface wetting film covering of the pine oil may be obtained on the tubes 43 by dripping or running it directly thereon in any suitable manner (not shown). However, as mentioned, the pine oil is advantageously applied by being precipitated from the heat-exchanging first-effect vapors after having been incorporated therein as a spray 69 from an atomizing nozzle 67. The nozzle 67 is positioned on the second-effect evaporator body 36 in the vapor chest 42. The pine oil is supplied under pressure to the nozzle 67 by a pump 65 through a supply line 64 from a storage supply tank 63. Other suitable means, including pneumatic or steam jet means, may also be employed for spraying or atomizing the pine oil into the vapors. It is desirable to heat the pine oil before applying it, especially when it is to be first incorporated in the vapors. Heated pine oil is usually more readily vaporized or dispersed by the atomizing nozzle 67 or other means employed. The pine oil, after being applied to the surface of the tubes to release the accumulated sulfur deposits, is removed while containing the sulfur deposits by being flushed from the surface through the washing effect of further condensing vapors. The mixture of pine oil and condensate is disposed of through the second-effect trap and outlet 48.

The atomizing nozzle 67 may be positioned to spray the pine oil into the vapor before it enters the vapor chest 42. As shown in Figure 2, the atomizing nozzle 67 is located in the vapor line 28 and, concurrently with the flow of the vapors, injects the spray 69 of the pine oil into the vapor stream while it is passing from the first to the second-effect of the evaporator. Under some conditions of rapid and turbulent vapor flow, this technique may effect a better dispersed incorporation of pine oil in the vapor.

When it is desired to precede application of the pine oil with an application of an organic acid material to facilitate removal of sulfur deposits containing minor proportions of deposited zinc compounds, the same techniques may be employed. The organic acid material may be directly applied to the heat-transfer surface or, advantageously, may be first incorporated in the vapors with the atomizing nozzle 67, then precipitated on the surface in a manner similar to that employed for the pine oil.

Vapors from the second-effect of the evaporator, according to conventional practice, are withdrawn through a vapor line 53 and catchall 55, having an entrained liquor return 56, to a condenser 58. They are handled under a vacuum at less absolute pressure, as mentioned, than that of the vapors from the first-effect of the evaporator. The condenser 58 can be of any suitable type, such as the barometric type depicted. Condenser water is introduced through an inlet 59. The condenser outlet 60 discharges to a hot-well, or as otherwise desired. If more than two effects are employed for the evaporator, the vapors from the second-effect of the evaporator are utilized, in an analogous manner, as the heat-exchanging medium for subsequent effects.

The finally concentrated spent coagulating liquid or thick liquor is withdrawn from the boiling liquor compartment 49 through the outlet 51. It may then be further processed for recovery of constituent materials as in a crystallizer, or it may be otherwise used, as desired.

Generally, enough of the pine oil to form a generous film on the heat-transfer surface is required to release the sulfur deposits for removal from the heat-transfer surface. Application of such an amount sufficiently wets the surface to thoroughly subject the deposits to the effect of the pine oil. To illustrate, it is advantageous to apply a film covering of pine oil weighing at least about 0.015 pound to each square foot of heat-transfer surface which is cooling or condensing vapors containing appreciable amounts of free, elemental sulfur. More advantageously, however, a film of about 0.030 pound per square foot of heat-transfer surface may be applied to facilitate the surface cleaning by deposit release and removal. This amounts to surface films having approximate volumes of about one-quarter and one-half fluid ounces respectively per square foot of heat-transfer surface.

It is desirable to prevent the sulfur deposit accumulation on the heat-transfer surfaces from exceeding more than about 11 pounds per thousand square feet of heat-transfer surface before being removed by an application of at least about 1.4 pounds of pine oil per pound of accumulated sulfur deposit. More advantageously, about 2.8 pounds of pine oil per pound of sulfur deposit is employed. The application intervals for the pine oil are therefore predeterminedly spaced to prevent such accumulations from being exceeded. For example, in the second-effect of a multiple-effect evaporator having about 4,000 square feet of heat-transfer surface for exchanging heat from and condensing heat-supplying vapors containing about 15 p. p. m. by volume or approximately about 215 p. p. m. by weight of free, elemental sulfur of which about 100 p. p. m. by weight deposits on the surface, at least about 60 pounds, and more advantageously about 120 pounds, of pine oil would be applied to the surface after not more than about 44 pounds of sulfur deposit had accumulated thereon. If, for purposes of illustration, entrainment of coagulating liquid is ignored, about 500,000 pounds of the vapors would be condensed while the sulfur deposit was being accumulated on the heat-transfer surface. If the second-effect of the evaporator had a capacity of about 40,000 pounds of condensate per hour, the pine oil would be applied during intervals predeterminedly spaced to occur after not longer than about each 12½ hour period. Between these intervals, not more than about 8⅓ thousand parts by weight of the vapors containing, as mentioned, about 15 p. p. m. by volume of free, elemental sulfur would be condensed before each application to the heat-transfer surface of at least about one part by weight of pine oil is made. The part by weight of pine oil in such case is an amount sufficient to cover the heat-transfer surface with the desired film. More advantageously, when vapors having about the specified sulfur content are being condensed, about one part by weight of pine oil in an amount sufficient to effect the desired surface wetting film covering on the heat-transfer surface is applied during intervals spaced after not more than about 4⅙ thousand parts by weight of the vapors have condensed on the surface. Frequently it may be found even more desirable to prevent the sulfur deposit accumulations from exceeding not more than about 10 or 9 pounds per thousand square feet before they are removed by the pine oil applications.

The application of the pine oil is made during a relatively short interval which should not exceed more than about 15 to 30 minutes so that the presence of the pine oil film on the heat-transfer surface may be as effective as possible. Usually a satisfactory application can be made well within such an interval. Also, since a generous film of the pine oil tends to reduce the heat-exchanging efficiency of the heat-transfer surface, it is desirable for the spaced intervals to be of relatively short duration so that the influence of the film on the overall heat-exchanging rate of the heat-transfer surface will be minimized to an inconsequential degree. However, when the pine oil is incorporated in the vapors, care must be taken to avoid excessively heavy spraying which might cause a flooding or premature precipitation from the vapors before contacting the deposit-clogged heat-transfer surface.

While a continuous application of the pine oil might function to eliminate sulfur deposits, it might also be less desirable than applications made at predetermined spaced intervals. An excessive and uneconomical consumption of the pine oil might thereby result. Further, the continuous presence of a film covering of pine oil on the heat-transfer surfaces might have an objectionable deleterious effect on its heat-exchanging capacity.

As mentioned, when the sulfur deposits contain minor proportions of deposited zinc compounds, such as zinc sulfide, the application of the pine oil to the heat-transfer surface may advantageously be preceded by a like application of an organic acid material, such as oleic acid and the like, capable of forming oil soluble zinc esters with the deposited zinc compounds. The material should have no corrosive effect on the heat-transfer surface. The preliminary effect of such a material on the zinc deposits is to render them more susceptible to the action of the pine oil to further facilitate the effective and substantial removal of the sulfur deposits. Ordinarily, an amount of an organic acid material approximately equal in weight to the amount of the pine oil is advantageously employed. If desired, the organic acid material may be applied to the surface along with the pine oil. However, its beneficial effect is usually not so pronounced in this manner. Frequently, preliminary treatment with the organic acid material may be dispensed with and only the pine oil employed to effectively maintain a relatively clean and substantially deposit-free heat-transfer surface. This may often be the case when the intervals during which the pine oil is applied are sufficiently close spaced to prevent an excessively thick deposit from accumulating so that the deposit of zinc compounds is not sufficient to block or interfere with the action of the pine oil.

Pine oils are volatile oils having characteristic pineaceous odors. They consist primarily of isomeric tertiary and cyclic terpene alcohols with variable quantities of terpene hydrocarbons, ethers, ketones, phenols and phenolic ethers. Advantageously, the pine oils employed in the present invention are fractionated and refined from whole-run natural pine oils, which are obtained by distillation of various parts of pine trees, so as to have a lowered content of fenchone and fenchyl alcohol. It is desirable for the refined pine oils to have a total terpene alcohol content of at least about 70% by weight. The A. S. T. M. boiling range will vary from about 190–220° C. to about 198–235° C. The flash points of the material by the Cleveland Open Cup Method may be between about 65 to about 90° C. It may vary in weight from about 7.20 to about 7.90 pounds per gallon. A typical refined pine oil which may advantageously be employed in the present invention has an approximate chemical composition by weight of about 65 to 70% of alpha-terpineol; about 10% of dihydro-alpha-terpineol and other tertiary alcohols; about 10 to 15% of borneol and fenchyl alcohols; about 5% of estragole; and about 5 to 10% of various terpene ketones. If desired, the pine oil, as utilized, may be diluted more or less with a mineral oil, although not more than about 50% by weight, and more desirably not more than about 25% by weight of mineral oil should be so employed.

The pine oil may be recovered from the condensed vapor in which it has been incorporated by simple separatory techniques. If desired, the recovered pine oil may be reclaimed and re-used in an evaporator or on any other heat-transfer surface to effect a more economical practice.

Since certain changes in the practice of this invention may readily be effected without departing substantially from its intended spirit or scope, it is to be fully and completely understood that all of the foregoing description be considered and interpreted as being merely illustrative and in no sense or meaning limiting or restrictive of the invention as it is particularly pointed out and defined in the appended claims.

What is claimed is:

1. Method for removing sulfur deposits on a heat-transfer surface yielded from vapors evaporated from spent viscose coagulating liquids comprising; applying a surface wetting film of a pine oil to a heat-transfer surface bearing sulfur deposits; then washing said pine oil film and said released sulfur deposits from said surface with condensate from vapors condensing on said surface subsequent to the application of said pine oil.

2. Method for removing sulfur deposits on a heat-transfer surface exchanging heat from vapors evaporated from spent viscose coagulating liquids and the like and containing amounts of free, elemental sulfur which forms deposits on said surface comprising; applying a surface wetting film covering of a pine oil to said surface bearing said sulfur deposits; then washing said pine oil film and the released sulfur deposits from said surface with condensate from vapors condensing on said surface subsequent to the application of said pine oil.

3. Method for removing sulfur deposits on a heat-transfer surface exchanging heat from vapors evaporated from spent viscose coagulating liquids and the like and containing appreciable amounts of free, elemental sulfur which forms deposits on said surface comprising; applying, at spaced intervals, a surface wetting film covering of a pine oil to said surface bearing said sulfur deposits; then washing said pine oil film and the released sulfur deposits from said surface with condensate from vapors condensing on said surface between said spaced intervals subsequent to the application of said pine oil.

4. In the method according to claim 3 wherein said intervals during which said pine oil is applied to said heat-transfer surface are spaced after not more than about 11 pounds of said sulfur deposit have accumulated over about each thousand square feet of heat-transfer surface.

5. Method for removing sulfur deposits on a heat-transfer surface exchanging heat from vapors evaporated from spent viscose coagulating liquids and the like and containing appreciable amounts of free, elemental sulfur which forms deposits on said surface comprising; incorporating a pine oil at spaced intervals in said vapors in an amount sufficient to cover said heat-transfer surface with a surface wetting film of said pine oil; precipitating a film of pine oil from said vapors onto said heat-transfer surface bearing said sulfur deposits while said vapors are exchanging heat thereto; then washing said pine oil film and the released sulfur deposits from said surface with condensate from vapors condensing on said surface between said spaced intervals subsequent to the incorporation of said pine oil in said vapors.

6. In the method according to claim 5 wherein the amount of pine oil incorporated in said vapors is sufficient to cover said heat-transfer surface with a film weighing at least about 0.015 pound per square foot.

7. In the method according to claim 5 wherein the amount of pine oil incorporated in said vapors is sufficient to cover said heat-transfer surface with a film weighing about 0.030 pound per square foot.

8. In the method according to claim 5 wherein said intervals during which said pine oil is incorporated in said vapors to be precipitated therefrom onto said heat-transfer surface are spaced after not more than about 11 pounds of said sulfur deposit have accumulated on about each thousand square feet of heat-transfer surface.

9. In the method according to claim 5 wherein said pine oil is incorporated in said vapors by being sprayed therein.

10. Method for removing sulfur deposits on a heat-transfer surface exchanging heat from vapors evaporated from spent viscose coagulating liquids and the like and containing between about 10 and about 20 p. p. m. by volume of free, elemental sulfur, substantial portions of which deposit on said surface, comprising; spraying at spaced intervals in said vapors at least about 1.4 parts by weight of a pine oil for about each part by weight of sulfur deposit accumulated on said heat-transfer surface between said intervals, said intervals being spaced to occur after not more than about 11 pounds of said sulfur deposit has accumulated over about each thousand square feet of said surface, said pine oil being an amount sufficient to cover said heat-transfer surface with a film weighing at least about 0.015 pound per square foot; precipitating a film of pine oil from said vapors onto said heat-transfer surface bearing said sulfur deposits while said vapors are exchanging heat thereto; then washing said pine oil film and the released sulfur deposits from said surface with condensate from vapors condensing on said surface between said spaced intervals subsequent to the spraying of said pine oil in said vapors.

11. In the method according to claim 10 wherein about 2.8 parts by weight of said pine oil is incorporated in said vapors for about each part by weight of said sulfur deposit accumulated on said surface between said intervals, said pine oil being an amount sufficient to cover said heat-transfer surface with a film of about 0.030 pound per square foot.

12. Method for removing sulfur deposits on a heat-transfer surface exchanging heat from vapors evaporated from spent viscose coagulating liquids and the like and containing about 15 p.p.m. by volume of free, elemental sulfur, substantial portions of which deposit on said surface, comprising; spraying at spaced intervals into said vapors at least about one part by weight of a pine oil after not more than about 8⅓ thousand parts by weight of said vapors have been condensed on said surface, said part by weight of pine oil being an amount sufficient to cover said heat-transfer surface bearing said sulfur deposits with a surface wetting film covering weighing at least about 0.015 pound per square foot; precipitating a film of pine oil from said vapors onto said heat-transfer surface bearing said sulfur deposits while said vapors are exchanging heat thereto; then washing said pine oil film and the released sulfur deposits from said surface with condensate from vapors condensing on said surface between said spaced intervals subsequent to the spraying of said pine oil in said vapors.

13. In the method according to claim 12 wherein about one part by weight of said pine oil is sprayed into said vapors to be incorporated therein during intervals spaced after about 4⅙ thousand parts by weight of said vapors have been condensed on said surface, said part by weight of pine oil being an amount sufficient to cover said heat-transfer surface with a surface wetting film covering weighing about 0.030 pound per square foot.

14. Method for removing sulfur deposits on a heat-transfer surface exchanging heat from vapors evaporated from spent viscose coagulating liquids and the like containing zinc ions, said vapors containing appreciable amounts of free, elemental sulfur and entrained zinc ion-containing liquid which forms sulfur deposits on said surface containing minor proportions of deposited zinc compounds comprising; first applying at spaced intervals to said surface bearing said sulfur deposits a surface wetting film covering of oleic acid capable of forming oil soluble zinc esters with portions of said deposits; then applying to said surface during the same interval a surface wetting film covering of a pine oil; and washing said films and the released sulfur deposits from said surface with condensate from vapors condensing on said surface between said spaced intervals subsequent to the application of said oleic acid and said pine oil.

15. Method for removing sulfur deposits on a heat-transfer surface exchanging heat from vapors evaporated from spent viscose coagulating liquids and the like containing zinc ions, said vapors containing appreciable amounts of free, elemental sulfur and entrained zinc ion-containing liquid which forms sulfur deposits on said surface containing minor proportions of deposited zinc compounds comprising; first incorporating in said vapors at spaced intervals occurring after not more than about eleven pounds of sulfur deposit has accumulated on about each thousand square feet of said surface, oleic acid for forming oil soluble zinc esters with portions of said deposited zinc compounds in an amount sufficient to cover said heat-transfer surface with a surface wetting film of said oleic acid; precipitating a film of said oleic acid from said vapors onto said heat-transfer surface bearing said sulfur deposits while said vapors are exchanging heat thereto; then incorporating in said vapors during the same interval a pine oil in an amount sufficient to cover said heat-transfer surface with a surface wetting film; precipitating a film of said pine oil from said vapors onto said heat-transfer surface while said vapors are exchanging heat thereto; and washing said films and the released sulfur deposits from said surface with condensate from vapors condensing on said surface between said spaced intervals subsequent to the incorporation of said oleic acid and said pine oil in said vapors.

No references cited.